(12) United States Patent
Chalifoux et al.

(10) Patent No.: US 12,741,339 B2
(45) Date of Patent: Sep. 22, 2026

(54) OPTICAL SYSTEM, LASER SPOT POSITION DETERMINATION PROCESS, AND CALIBRATION PROCESS FOR DETERMINISTICALLY SHAPING SUBSTRATES USING LASER PULSES

(71) Applicant: ARIZONA BOARD OF REGENTS ON BEHALF OF THE UNIVERSITY OF ARIZONA, Tucson, AZ (US)

(72) Inventors: Brandon Chalifoux, Tucson, AZ (US); Ian Arnold, Tucson, AZ (US); Kevin Laverty, Tucson, AZ (US)

(73) Assignee: Arizona Board of Regents On Behalf Of The University Of Arizona, Tucson, AZ (US)

( * ) Notice: Subject to any disclaimer, the term of this patent is extended or adjusted under 35 U.S.C. 154(b) by 339 days.

(21) Appl. No.: 18/291,121

(22) PCT Filed: Jul. 21, 2022

(86) PCT No.: PCT/US2022/037887
§ 371 (c)(1),
(2) Date: Jan. 22, 2024

(87) PCT Pub. No.: WO2023/004048
PCT Pub. Date: Jan. 26, 2023

(65) Prior Publication Data

US 2024/0359267 A1 Oct. 31, 2024

Related U.S. Application Data

(60) Provisional application No. 63/224,359, filed on Jul. 21, 2021.

(51) Int. Cl.
*B23K 26/50* (2014.01)
*B23K 26/0622* (2014.01)
(Continued)

(52) U.S. Cl.
CPC .......... *B23K 26/50* (2015.10); *B23K 26/0622* (2015.10); *B23K 26/0823* (2013.01);
(Continued)

(58) Field of Classification Search
CPC .......................... B23K 26/50; B23K 26/0622; B23K 26/0823; B23K 26/0861; B23K 2103/54; G01L 5/16
See application file for complete search history.

(56) References Cited

U.S. PATENT DOCUMENTS 7,027,155 B2 * 4/2006 Cordingley ........ B23K 26/0736 257/E23.15
8,193,468 B2 * 6/2012 Cordingley ........ B23K 26/0736 219/121.85

(Continued)

OTHER PUBLICATIONS

International Search Report issued in PCT/US2022/037887 on Dec. 15, 2022 (4 pages).

(Continued)

*Primary Examiner* — Gertrude Arthur Jeanglaude
(74) *Attorney, Agent, or Firm* — Smith, Gambrell & Russell LLP

(57) ABSTRACT

Methods for determining laser pulse positions for shaping an optical element may comprise: determining a stress field for at least a portion of a substrate, wherein the stress field comprises at least three components of stress, wherein the stress field comprises a plurality of stress states for the at least a portion of the substrate; determining, based at least on the stress field and a calibration model, a spot density over the at least a portion of the substrate; determining, based on the spot density, a laser spot position allocation that arranges a number of laser pulses into a minimum number of lines that achieves the spot density; and causing, based on the laser spot position allocation, output of a machine program that coordinates a rotation stage, beam shaping, a translation (Continued)

Equibiaxial Antibiaxial Shear $N_{yy}^{f}$ $N_{xy}^{f}$ $N_{xx}^{f}$ = $N_e$ $N_e$ + $-N_a$ $N_a$ + $N_s$ stage, and a laser firing parameter for surface shaping of the at least a portion of the substrate.

14 Claims, 14 Drawing Sheets

(51) Int. Cl.
*B23K 26/08* (2014.01)
*B23K 103/00* (2006.01)
*G01L 5/16* (2020.01)

(52) U.S. Cl.
CPC ...... *B23K 26/0861* (2013.01); *B23K 2103/54* (2018.08); *G01L 5/16* (2013.01)

(56) References Cited

U.S. PATENT DOCUMENTS 10,353,295 B2 * 7/2019 Dmitriev .................. G03F 1/60
10,481,020 B2 * 11/2019 Osten .................... G01L 5/0047
2006/0028655 A1 * 2/2006 Cordingley ........ B23K 26/0736 257/E23.15
2010/0243626 A1 * 9/2010 Baldwin ............ B23K 26/0622 219/121.72
2018/0138446 A1 5/2018 Dabich, II et al.
2018/0202872 A1 * 7/2018 Osten ...................... B05C 11/00
2020/0164470 A1 * 5/2020 Booth ................ B23K 26/0626
2021/0047729 A1 2/2021 Yao et al.

OTHER PUBLICATIONS

Written Opinion issued in PCT/US2022/037887 on Dec. 15, 2022 (5 pages).
Chalifoux et al., “Compensating film stress in thin silicon substrates using ion implantation”, Opt Express. Apr. 15, 2019;27(8):11182-11195. doi: 10.1364/OE.27.011182.

* cited by examiner

OPTICAL SYSTEM, LASER SPOT POSITION DETERMINATION PROCESS, AND CALIBRATION PROCESS FOR DETERMINISTICALLY SHAPING SUBSTRATES USING LASER PULSES

CROSS-REFERENCE TO RELATED APPLICATIONS

The present invention is filed under 35 U.S.C. § 371 as the U.S. national phase of International Application No. PCT/US2022/037887, filed Jul. 21, 2022, which designated the U.S. and claims the right of priority of U.S. Provisional Application Ser. No. 63/224,359, filed on Jul. 21, 2021. The entire disclosures of the above-identified priority applications are hereby fully incorporated herein by reference.

BACKGROUND

An optical substrate can be deformed in a controlled way by generating stress near the substrate surfaces by creating local bending moments akin to thin film stress.

However, improvements are needed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for determining laser pulse positions for shaping an optical element. The method also includes determining, based at least on a computational model and a target substrate deformation, a stress field for at least a portion of a substrate, where the stress field may include at least three components of stress, where the stress field may include a plurality of stress states for the at least a portion of the substrate; determining, based at least on the stress field and a calibration model, a spot density over the at least a portion of the substrate; determining, based on the spot density, a laser spot position allocation that arranges a number of laser pulses into a minimum number of lines that achieves the spot density; and causing, based on the laser spot position allocation, output of a machine program that coordinates a rotation stage, beam shaping, a translation stage, and a laser firing parameter for surface shaping of the at least a portion of the substrate. Other embodiments of this aspect include corresponding computer systems, apparatus, and computer programs recorded on one or more computer storage devices, each configured to perform the actions of the methods.

One general aspect includes a method for determining laser pulse positions for shaping an optical element. The method also includes determining, based at least on a computational model and a target substrate deformation, a stress field for at least a portion of a substrate, where the stress field may include at least three components of stress, where the stress field may include a plurality of stress states for the at least a portion of the substrate; determining, based on the stress field, one or more calibration constants; determining, based on at least on the one or more calibration constants, a spot density over the at least a portion of the substrate; determining, based on the spot density, a laser spot position allocation that arranges a number of laser pulses into a minimum number of lines that achieves the spot density; and causing, based on the laser spot position allocation, output of a machine program that coordinates a rotation stage, a translation stage, and a laser firing for surface shaping of the at least a portion of the substrate. Other embodiments of this aspect include corresponding computer systems, apparatus, and computer programs recorded on one or more computer storage devices, each configured to perform the actions of the methods.

One general aspect includes a method for iterative correction of a shaped substrate. The method also includes determining, by measuring a substrate surface, that the substrate is outside a target specification; determining, using a location of prior write pulses applied to the substrate, an unmodified region of the substrate; causing, using one or more corrective write pulses, corrective surface shaping of at least a portion of the unmodified region of the substrate; and determining, by measuring the substrate surface, whether the corrected substrate is outside the target specification. Other embodiments of this aspect include corresponding computer systems, apparatus, and computer programs recorded on one or more computer storage devices, each configured to perform the actions of the methods.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
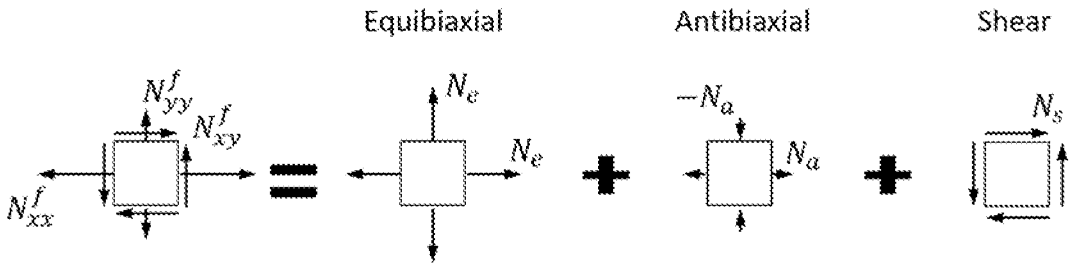
FIG. 1 shows stress components.
Figure 2:
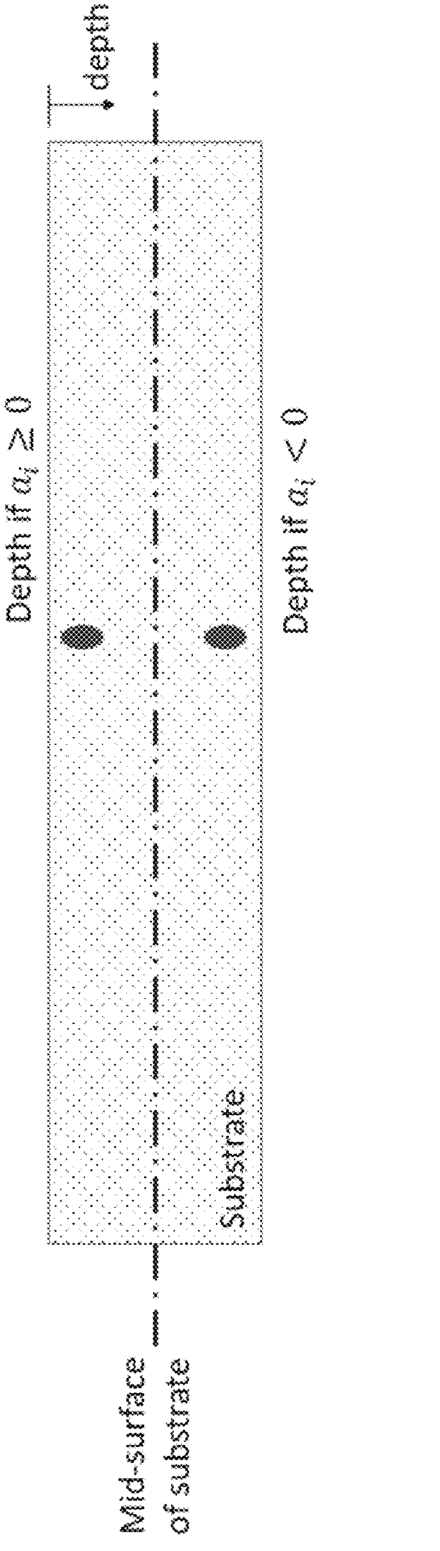
FIG. 2 shows an example representation of laser pulse depth in a substrate.
Figure 3:
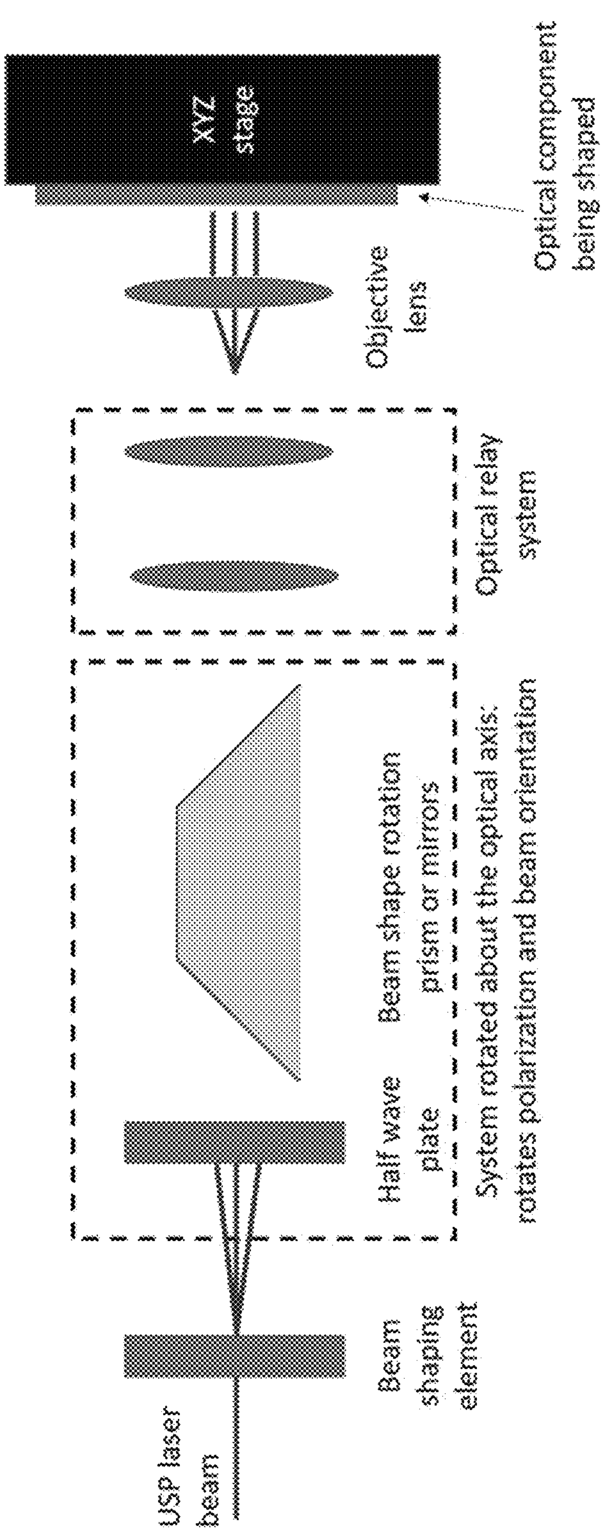
FIG. 3 shows an example optical system.
Figure 4:
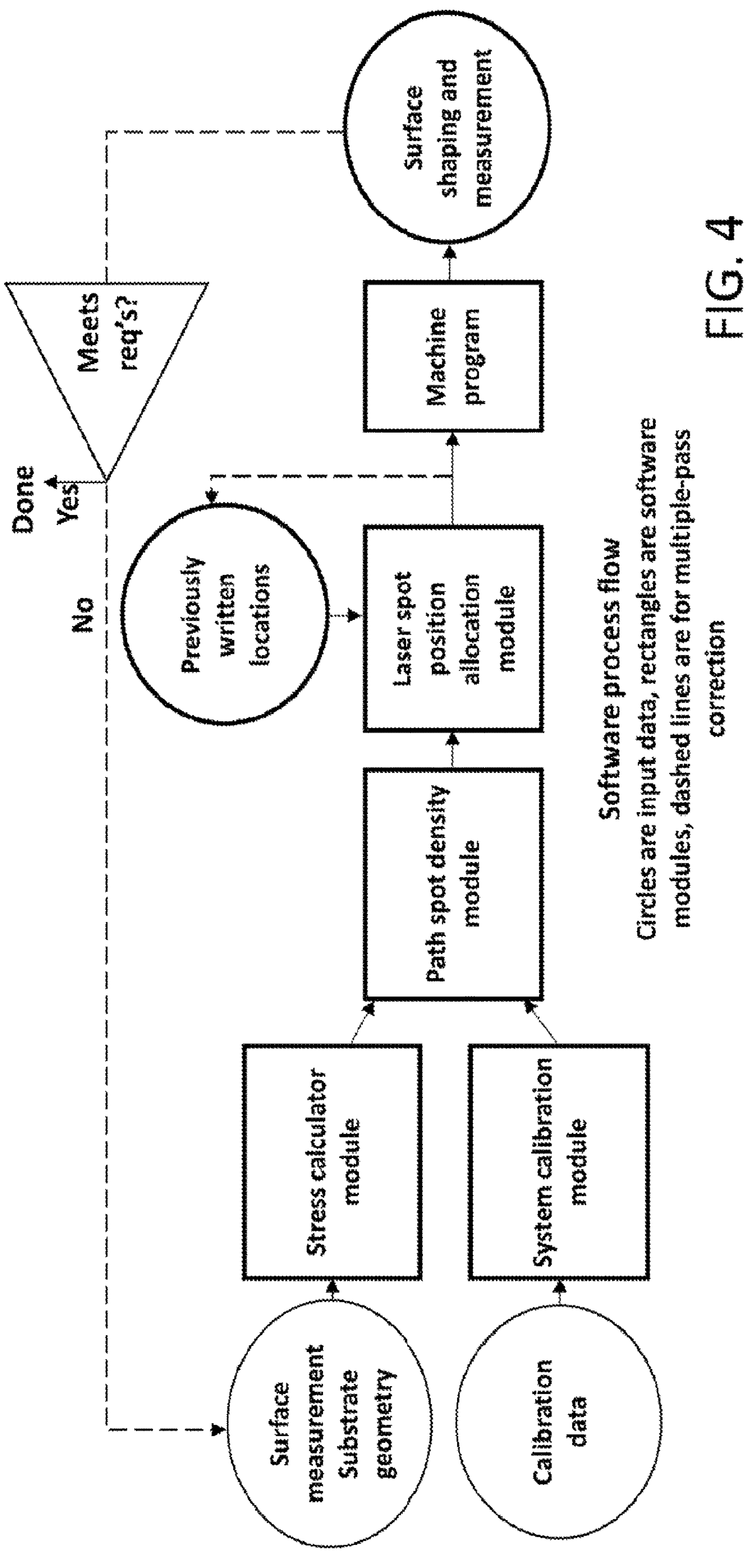
FIG. 4 shows an example flow chart for determining pulse positions.
Figure 5:
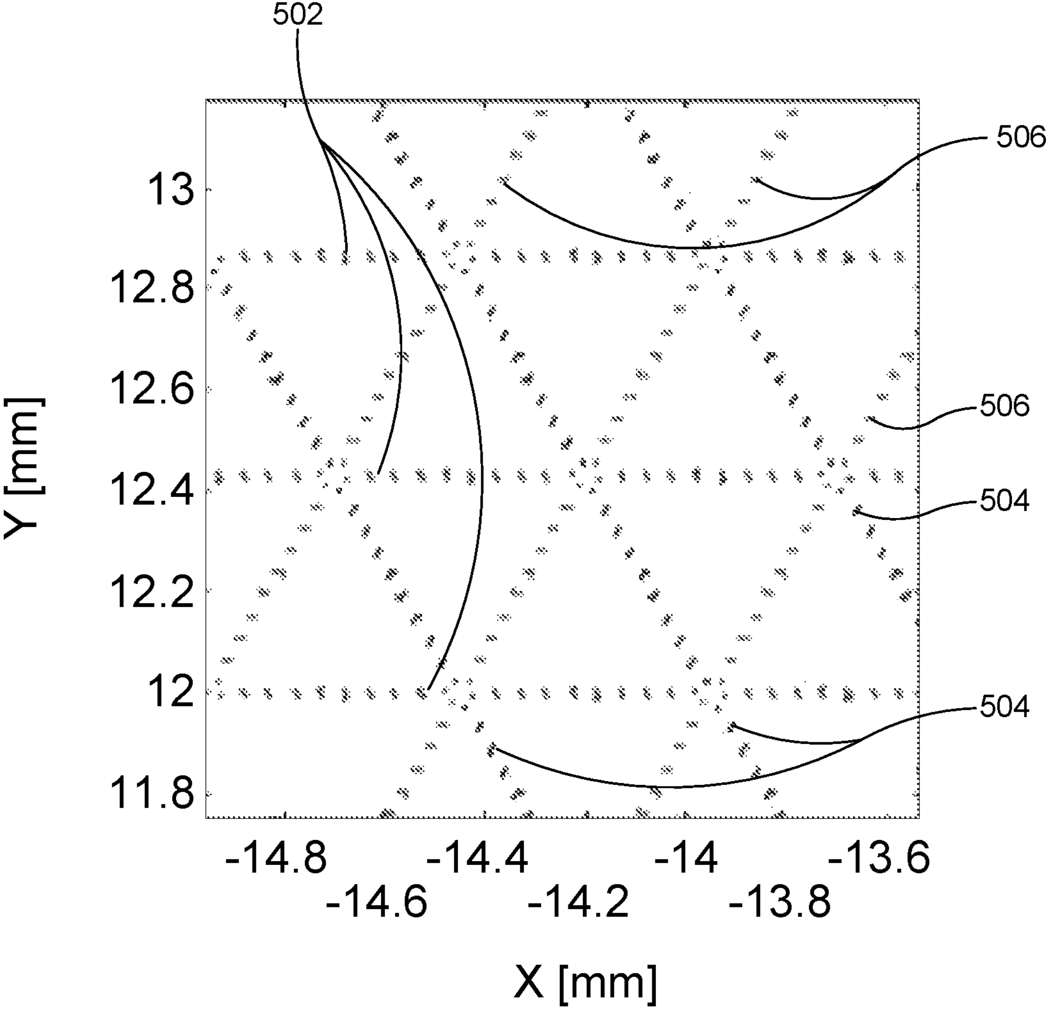
FIG. 5 shows an example plot of paths.

Disclosed herein are systems and methods for determining laser pulse positions in an optical element to be shaped.

A first example method may comprise determining, based at least on a computational model and a target substrate deformation, a stress field for at least a portion of a substrate, where the stress field may include at least three components of stress, where the stress field may include a plurality of stress states for the at least a portion of the substrate; determining, based at least on the stress field and a calibration model, a spot density over the at least a portion of the substrate; determining, based on the spot density, a laser spot position allocation that arranges a number of laser pulses into a minimum number of lines that achieves the spot density; and causing, based on the laser spot position allocation, output of a machine program that coordinates a rotation stage, beam shaping, a translation stage, and a laser firing parameter for surface shaping of the at least a portion of the substrate. Other embodiments of this aspect include corresponding computer systems, apparatus, and computer programs recorded on one or more computer storage devices, each configured to perform the actions of the methods.

The determining a stress field may be based on one or more of surface measurement or substrate geometry.

The determining, based on a calibration model, a spot density may comprise determining a plurality of calibration constants.

The determining a spot density may comprise writing laser pulses in a plurality of patterns over a sample substrate made of the same material of an optical component to be shaped.

The plurality of stress states may comprise six stress states.

The plurality of stress states may comprise six integrated stress states generated per unit of areal pulse density.

A first example system may comprise a system for implementing the first example method.

The first example system may comprise one or more of a laser source, polarization stage, a beam orientation stage, an optical relay system, an objective lens, or an XYZ stage.

Disclosed herein are systems and methods for determining laser pulse positions in an optical element to be shaped. A second example method may comprise determining, based at least on a computational model and a target substrate deformation, a stress field for at least a portion of a substrate, where the stress field may include at least three components of stress, where the stress field may include a plurality of stress states for the at least a portion of the substrate; determining, based on the stress field, one or more calibration constants; determining, based on at least on the one or more calibration constants, a spot density over the at least a portion of the substrate; determining, based on the spot density, a laser spot position allocation that arranges a number of laser pulses into a minimum number of lines that achieves the spot density; and causing, based on the laser spot position allocation, output of a machine program that coordinates a rotation stage, a translation stage, and a laser firing for surface shaping of the at least a portion of the substrate. Other embodiments of this aspect include corresponding computer systems, apparatus, and computer programs recorded on one or more computer storage devices, each configured to perform the actions of the methods.

The determining a stress field may be based on one or more of surface measurement or substrate geometry.

The determining spot density may comprise writing laser pulses in a plurality of patterns over a sample substrate made of the same material of an optical component to be shaped.

A second example system may comprise a system for implementing the second example method.

The first example system may comprise one or more of a laser source, polarization stage, a beam orientation stage, an optical relay system, an objective lens, or an XYZ stage. Other system components may be used.

The present disclosure relates to an optical system, laser spot position determination process, and calibration process for deterministically figuring thin mirrors by creating stress inside the glass substrate (or other material transparent to the laser beam wavelength) using an ultrashort pulsed (USP) laser. This disclosure may be applied to freeform surface height correction of, for example, telescope mirrors, semiconductor optical components, and head-mounted displays. This process is especially useful for low spatial frequency correction of optical components with high aspect ratio (lateral size to thickness ratio), a type of optical component that traditional grinding and polishing fails to address. The combination of the optical system, laser spot position determination process, and calibration process allows for improvement.

An optical substrate can be deformed in a controlled way by generating stress near the substrate surfaces, by creating local bending moments akin to thin film stress. Integrated stress, which is the stress in a thin region near the substrate surface(s) integrated through that region (SI units of N/m), is a more convenient measure than stress since the thickness of the laser-modified region is not well-defined and integrated stress is directly proportional to the quantity of interest, namely the 3 components of surface curvature.

Methods of determining a continuous integrated stress map may require at least three independent components of stress to generate deformations of any shape. Prior art represents these deformations as linear combinations of Zernike polynomials on round flat substrates, but stress can be used to generate desired deformations on non-flat (curved or freeform) substrates and non-circular substrates.

Equivalently, these three stress components can be transformed, through coordinate rotations, as any single stress state oriented in 3 unique directions. If a stress state can be generated (whether through USP laser pulses, film stress, or otherwise) in one orientation ($N_{e0}$, $N_{a0}$, $N_{s0}$), and if the stress state can be rotated to a plurality (e.g., three) unique orientations ($\phi_0$, $\phi_1$, $\phi_2$), then the stress state can be determined in the global coordinate frame ($N_e$, $N_a$, $N_s$) due to varying magnitudes of those three uniquely-oriented stress states ($a_0$, $a_1$, $a_2$).

$$\begin{bmatrix} N_e \\ N_a \\ N_s \end{bmatrix} = \begin{bmatrix} N_{e0} & N_{e0} & N_{e0} \\ N_{a0}\cos 2\phi_0 - & N_{a0}\cos 2\phi_1 - & N_{a0}\cos 2\phi_2 - \\ N_{s0}\sin 2\phi_0 & N_{s0}\sin 2\phi_1 & N_{s0}\sin 2\phi_2 \\ N_{a0}\sin 2\phi_0 + & N_{a0}\sin 2\phi_0 + & N_{a0}\sin 2\phi_1 + \\ N_{s0}\cos 2\phi_0 & N_{s0}\cos 2\phi_0 & N_{s0}\cos 2\phi_1 \end{bmatrix} \begin{bmatrix} a_1 \\ a_2 \\ a_3 \end{bmatrix}$$

For optical component shaping, the stress in the global coordinate frame ($N_e$, $N_a$, $N_s$) is known from means such as computational models, and the orientations ($\phi_0$, $\phi_1$, $\phi_2$) can be defined. The above system of equations can then be analytically or numerically inverted to produce the three magnitudes ($a_0$, $a_1$, $a_2$).

In general, these three magnitudes may be positive or negative. For an optical substrate, applying a set of laser pulses below the mid-surface of the substrate will produce nearly the opposite effect of applying the same set of pulses above the mid-surface. Therefore, the sign of each magnitude can be used to determine which of the two depths to locate laser pulses to achieve the desired stress state.

Since stress is used to deform the optical component, and this deformation is significantly larger at low spatial frequencies than at high spatial frequencies, the induced deformation has low sensitivity to laser pulse position. The generated stress state, averaged over an area with diameter several times the substrate thickness, significantly affects the induced deformation.

From the preceding discussion, a set of example conditions are presented to generate a desired deformation on an optical substrate by locating laser pulses appropriately:

1) Create a stress state comprising equibiaxial integrated stress in addition to antibiaxial and/or shear integrated stress ($N_{e0}$, $N_{a0}$, $N_{s0}$).
2) Be able to control the magnitude of the stress state ($a_0$, $a_1$, $a_2$).
3) Be able to rotate the stress state to at least three unique orientations ($\phi_0$, $\phi_1$, $\phi_2$).

Laser pulse positions may be adjusted to achieve the desired stress state while improving machine motion efficiency, process throughput, or other constraints. Areas may also be left unmodified by laser pulses for future additional correction steps.

Optical System

An example optical system controls beam shape, polarization and shape orientation, and focusing of a USP laser. The system comprises a fixed beam shaping element, a rotating prism for beam shape rotation coupled to a rotating half-wave plate for polarization rotation (both rotate the beam shape and polarization by twice the physical rotation angle), a relay optical system, and a focusing objective lens. Fold mirrors may be included. The optical component to be corrected is scanned in XYZ relative to the laser objective, or vice versa. Other optical systems, components, and setup may be used to achieve the same results.

As an illustrative example, this optical system provides at least 3 repeatable orientations of a shaped beam useful for creating 3 independent stress states to enable general correction. Laser pulses are positioned at two or more possible depths into the substrate, one on each side of the mid-surface, depending on the sign of the magnitude of each stress state component.

Beam shaping may include beam splitting (as shown in the diagram above), shaping of the focal volume in the propagation direction (e.g., Bessel beams, extended focus beams, or multi-focus beams), or shaping of the focal volume in the lateral direction. For beam shapes that are symmetric about the optical axis, beam shape rotation may be omitted.

Determination of Pulse Positions

The decision-making process to determine laser pulse positions, encoded in software, first determines the stress field (3 components of stress, $N_e$, $N_a$, $N_s$) to achieve the desired substrate deformation based on the surface measurement, substrate geometry, and an analytical or computational model. Reference is made to each combination of beam shape/polarization orientation and depth as a path, and there are six total paths. The system calibration module provides six integrated stress states generated per unit of areal pulse density (SI units of Nm, or N/m per (pulse/m$^2$)), determined through a separate calibration process for each path. The path spot density module inverts a 3×3 matrix containing the calibration constants from three paths. The sign of magnitudes at determine a map of the substrate indicating which set of three paths spots will be assigned to. The path spot density module then constructs and inverts an appropriate 3×3 matrix with the calibration constants from the appropriate paths, to yield the spot density for each path over the entire substrate surface. The laser spot position allocation module arranges the appropriate number of pulses into a minimum number of lines that achieves a particular spot density in each path in the vicinity of each line or set of lines. The software then calculates a machine program that coordinates the rotation stage, translation stages, and the laser firing.

There is flexibility to choose laser pulse positions on the substrate to improve process throughput, machine motion efficiency, and to maintain large unmodified areas of the substrate to enable future additional correction steps. Minimizing the number of lines achieves all three of these goals.

Calibration Process

There are six possible paths, and the goal of the calibration process is to determine 18 calibration constants, one for each path and for each integrated stress component $N_e$, $N_a$, $N_s$. The calibration process consists of writing laser pulses in 6 quasi-uniform patterns over a small sample substrate made of the same material of the optical component to be shaped. The 6 patterns are each of a single orientation and depth and represent the 6 paths. An example portion of three calibration patterns is shown below, where each point represents laser pulse position.

The sample is measured 7 times: before any patterns have been written, between each pattern, and at the end of the calibration process. The integrated stress generated by the calibration patterns are extracted from the measured average curvatures ($\kappa_{xx}$, $\kappa_{yy}$, $\kappa_{xy}$) of the sample:

$$N_e = \frac{Eh_s^2}{6(1-\nu)}\frac{1}{2}(\kappa_{xx}+\kappa_{yy}),\ N_a = \frac{Eh_s^2}{6(1+\nu)}\frac{1}{2}(\kappa_{xx}-\kappa_{yy}),\ N_s = \frac{Eh_s^2}{6(1+\nu)}\kappa_{xy},$$

Here, E and v are the substrate elastic modulus (Young's modulus) and Poisson's ratio, respectively, and $h_s$ is the substrate thickness. The calibration constants are extracted from the integrated stress data and the known laser pulse areal density of the calibration pattern. There is an assumed linear relationship between areal spot density and integrated stress, and the calibration spot density should be similar to the expected areal spot density of the optical component to be shaped.

Correction

In order to implement additional correction steps, if after the first correction the optical surface is still not within specifications, knowledge of where laser pulses have already been positioned may be obtained. However, due to the chosen laser pulse position allocation strategy, re-positioning tolerances in the laser processing machine can be loose.

An example method for iterative correction of a shaped substrate nay comprise determining, by measuring a substrate surface, that the substrate is outside a target specification; determining, using a location of prior write pulses applied to the substrate, an unmodified region of the substrate; causing, using one or more corrective write pulses, corrective surface shaping of at least a portion of the unmodified region of the substrate; and determining, by measuring the substrate surface, whether the corrected substrate is outside the target specification.

Figure 6A:
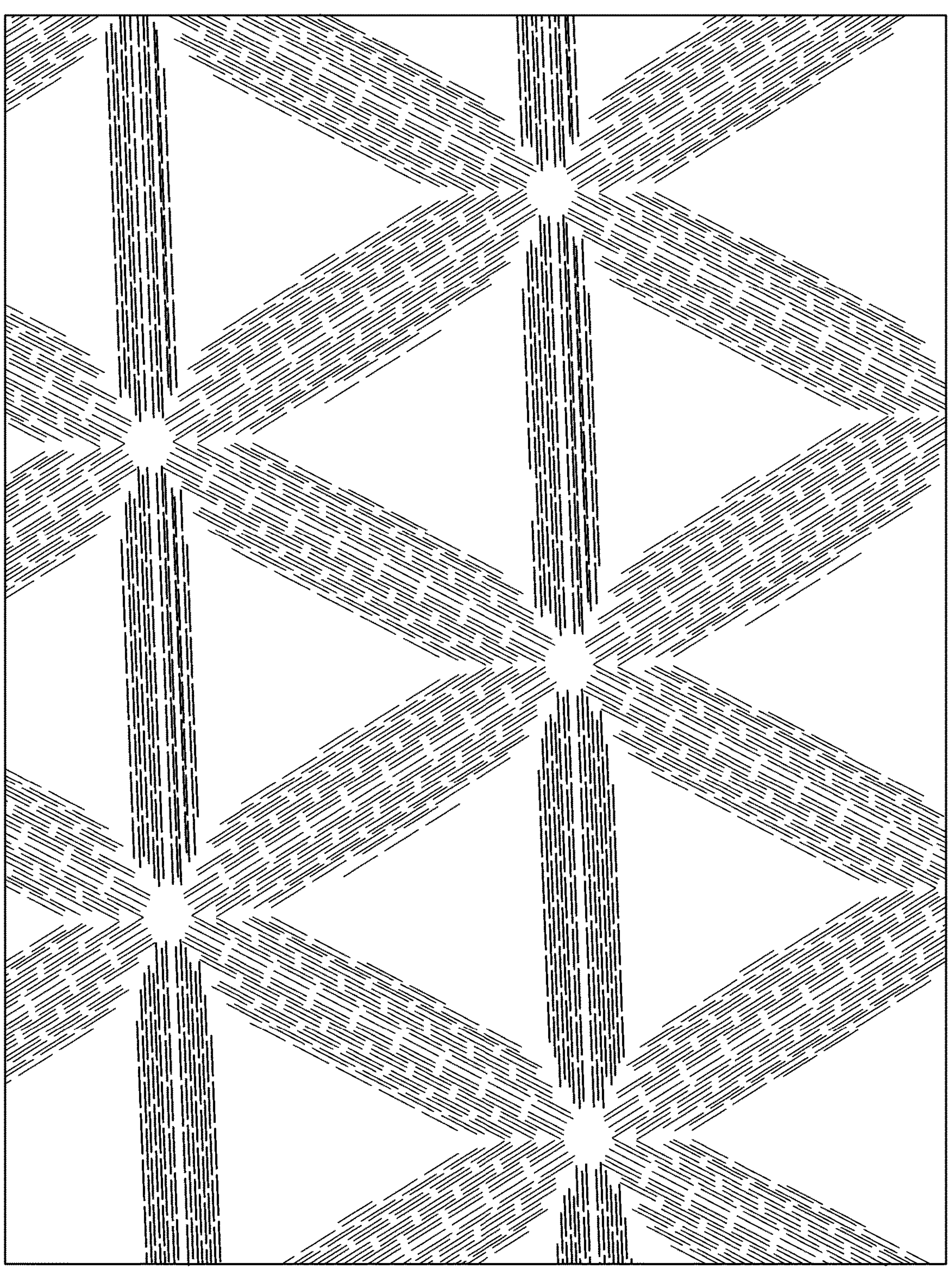
FIG. 6A shows a 10× magnified image of an example substrate with written lines viewed through crossed polarizers (at ±450 orientations), where horizontal lines are brighter than the others.

As an illustrative example, FIG. 6A illustrates an example shaped substrate under 10× magnification and showing a plurality of laser-generated modifications (e.g., lines) formed in a main body of the substrate. As shown, each triangle is 0.5 mm on a side. Viewed through crossed polarizers (at ±450 orientations), horizontal lines are brighter than the others. If the polarizers are rotated 120 degrees CW, the lines going up and to the left would become brightest. Each line is composed of segments. The open area or unmodified region between the modification lines is clear (e.g., for later correction iterations). As shown, the bright lines illustrate birefringence. Since the modifications were written with polarized beams, the polarization of the write pulse correlates to the stress state orientation.

Figure 6B:
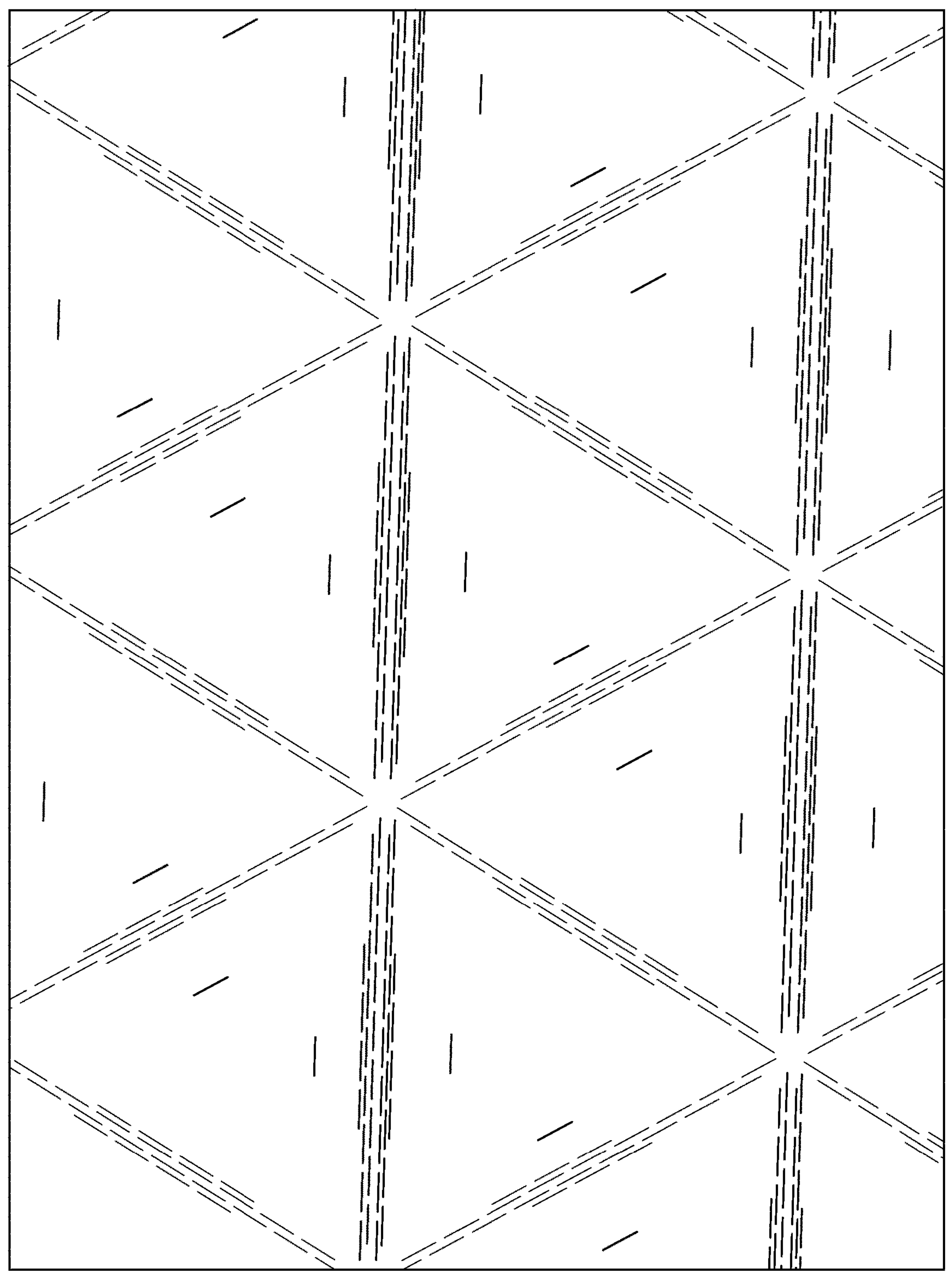
FIG. 6B shows a magnified image of an example substrate with written lines viewed through crossed polarizers (at ±45° orientations), also showing two separate correction cycles. The modifications from the second cycle are those closer to the center of each open space, separated from the lines written during the first cycle to avoid interaction.

FIG. 6B shows further laser-generated modifications in fused silica viewed under crossed-polarizers, showing two separate correction cycles. The modifications from the second cycle are those closer to the center of each open space, separated from the lines written during the first cycle to avoid interaction.

Figure 7:
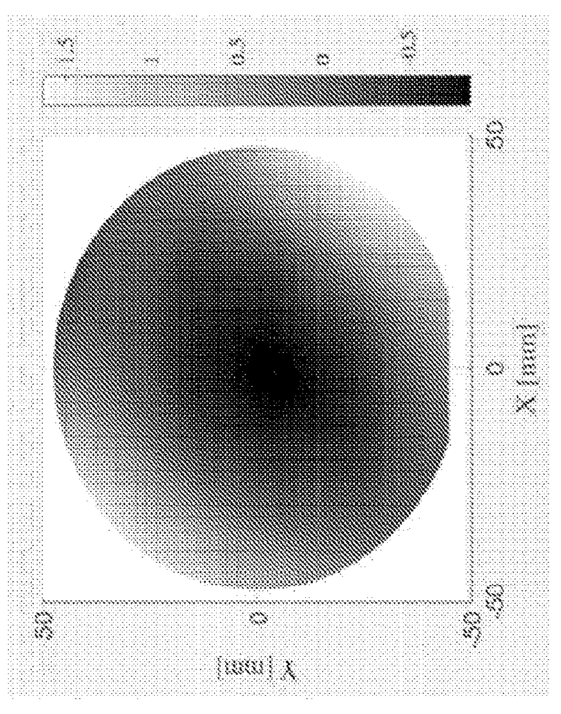
FIG. 7 shows surface height maps of an example substrate before and after iterative correction.
Figure 7:
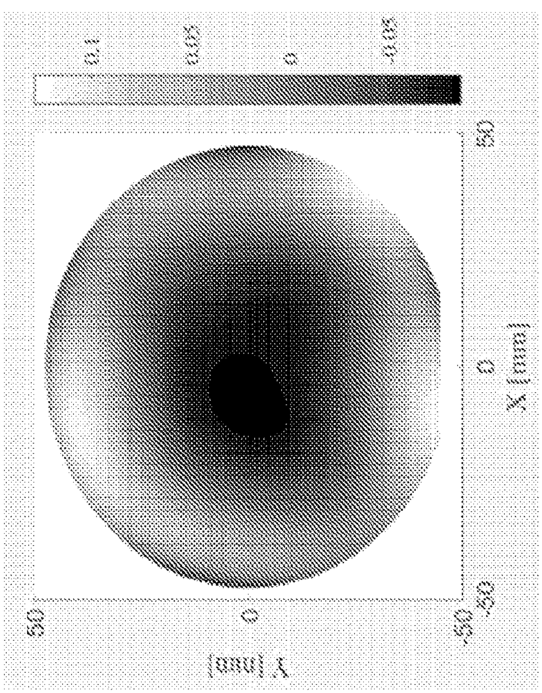
Figure 7:
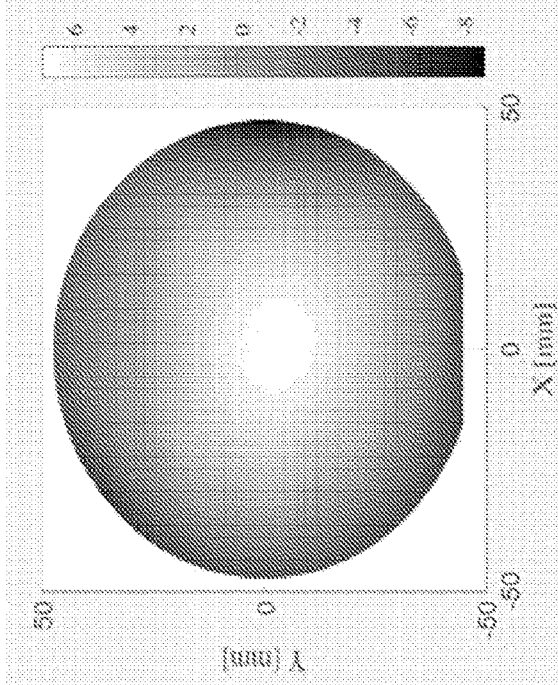
Figure 7:
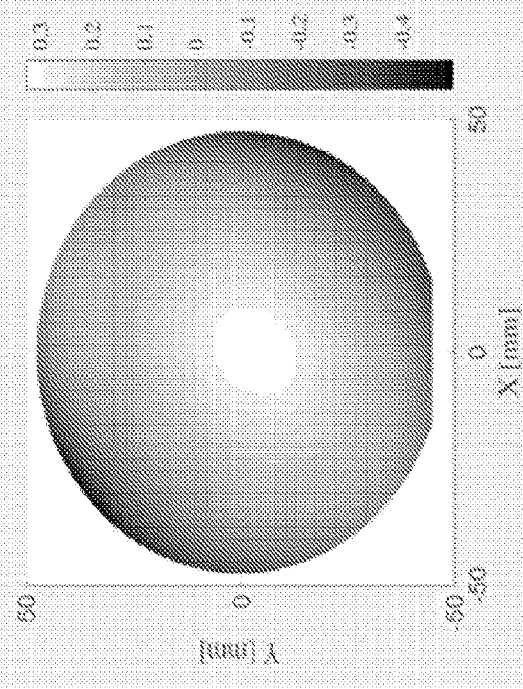

FIG. 7 shows surface height maps of an example substrate before and after iterative correction.

As described herein, substrates such as optical elements may be modified. A shaped optical substrate may comprise a main body. A plurality of laser-generated modifications (e.g., lines) may be formed in the main body, wherein the laser-generated modifications have a polarization that correlates with a stress state orientation of a portion of the main body adjacent the respective modification, and wherein the laser-generated modifications are grouped by polarization. Such grouping may be along a plurality of polarization axes. A plurality of unmodified regions may be defined in the main body by the absence of the laser generated modifications. The unmodified region may be corrected in addition iterative correction steps.

Figure 8:
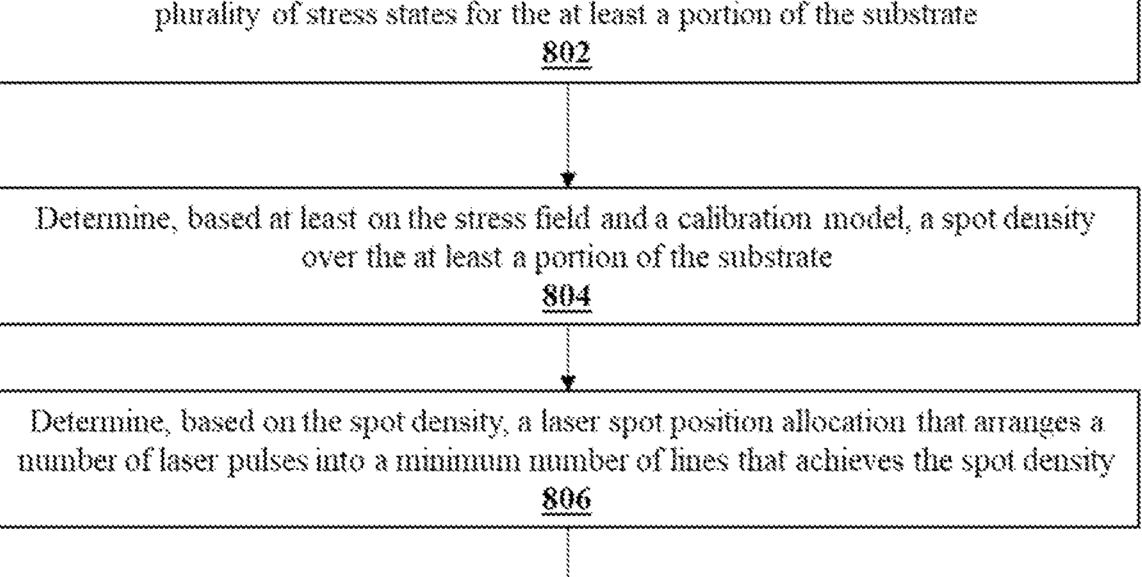
FIG. 8 shows a method flow diagram in accordance with the present disclosure.

FIG. 8 illustrates an example method 800. The method 800 may comprise determining, based at least on a computational model and a target substrate deformation, a stress field for at least a portion of a substrate, at 802. The stress field may include at least three components of stress. The stress field may include a plurality of stress states for the at least a portion of the substrate. The method 800 may comprise determining, based at least on the stress field and a calibration model, a spot density over the at least a portion of the substrate, at 804. The method 800 may comprise determining, based on the spot density, a laser spot position allocation that arranges a number of laser pulses into a minimum number of lines that achieves the spot density, at 806. The method 800 may comprise causing, based on the laser spot position allocation, output of a machine program that coordinates a rotation stage, beam shaping, a translation stage, and a laser firing parameter for surface shaping of the at least a portion of the substrate, at 808. Other embodiments of this aspect include corresponding computer systems, apparatus, and computer programs recorded on one or more computer storage devices, each configured to perform the actions of the methods.

Figure 9:
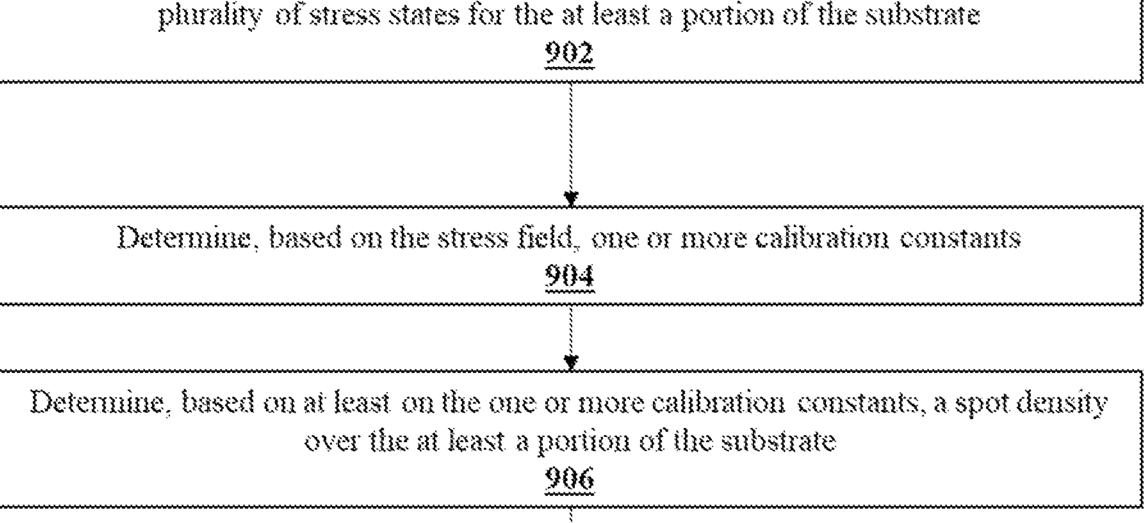
FIG. 9 shows a method flow diagram in accordance with the present disclosure.

FIG. 9 illustrates an example method 900. The method 900 may comprise determining, based at least on a computational model and a target substrate deformation, a stress field for at least a portion of a substrate, at 902. The stress field may include at least three components of stress. The stress field may include a plurality of stress states for the at least a portion of the substrate. The method 900 may comprise determining, based on the stress field, one or more calibration constants, at 904. The method 900 may comprise determining, based on at least on the one or more calibration constants, a spot density over the at least a portion of the substrate, at 906. The method 900 may comprise determining, based on the spot density, a laser spot position allocation that arranges a number of laser pulses into a minimum number of lines that achieves the spot density, at 908. The method 900 may comprise causing, based on the laser spot position allocation, output of a machine program that coordinates a rotation stage, a translation stage, and a laser firing for surface shaping of the at least a portion of the substrate, at 910. Other embodiments of this aspect include corresponding computer systems, apparatus, and computer programs recorded on one or more computer storage devices, each configured to perform the actions of the methods.

Figure 10:
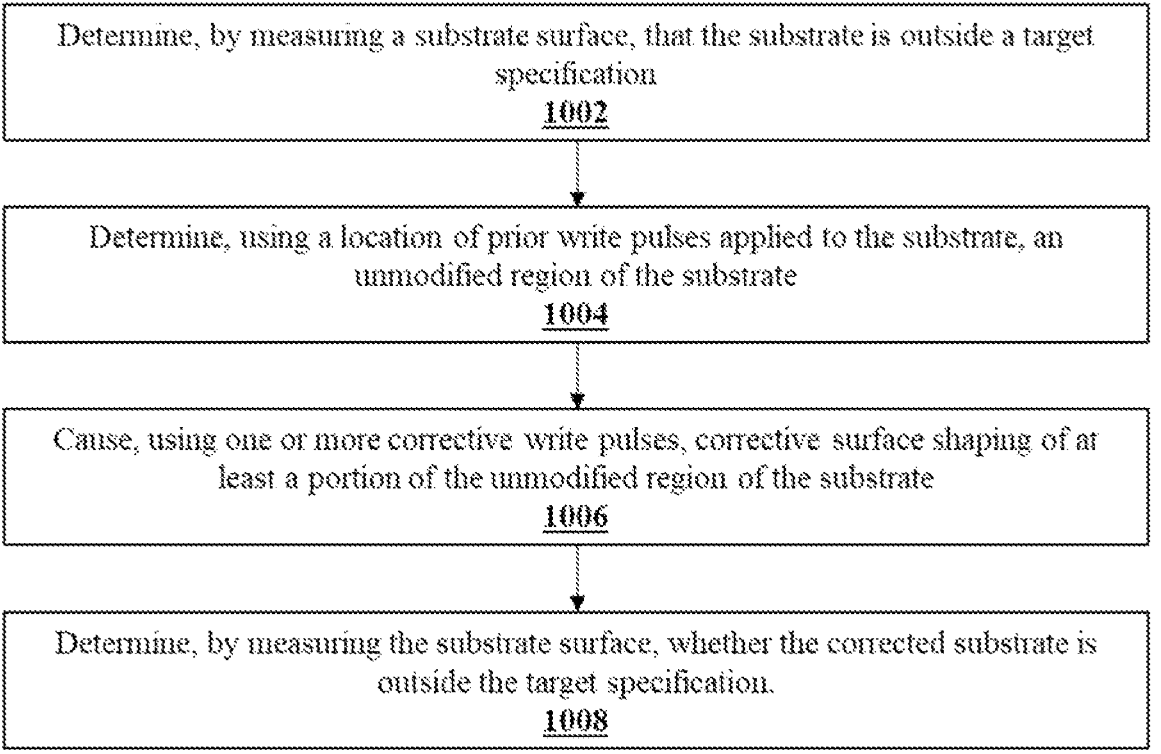
FIG. 10 shows a method flow diagram in accordance with the present disclosure.

FIG. 10 illustrates an example method 1000. The method 1000 may comprise determining, by measuring a substrate surface, that the substrate is outside a target specification, at 1002. The method 1000 may comprise determining, using a location of prior write pulses applied to the substrate, an unmodified region of the substrate, at 1004. The method 1000 may comprise causing, using one or more corrective write pulses, corrective surface shaping of at least a portion of the unmodified region of the substrate, at 1006. The method 1000 may comprise determining, by measuring the substrate surface, whether the corrected substrate is outside the target specification, at 1008. Other embodiments of this aspect include corresponding computer systems, apparatus, and computer programs recorded on one or more computer storage devices, each configured to perform the actions of the methods.

EXAMPLE

As an illustrative example, the present methods were applied for figure correction of glass mirrors using ultrafast lasers to generate controllable stress. As a further example, an ultrafast laser was used to correct figure errors in float glass mirrors by generating stress within the substrates, causing bending. A 5-15× height reduction was achieved in one cycle, and high equivalent material removal rate.

Introduction

Thin mirrors and other optical components are important for applications from consumer optics and concentrated solar energy to large-area space telescopes. Accurately figuring thin mirrors is challenging since they are compliant and subject to deformation during polishing processes in which forces are applied. Non-contact polishing processes like magnetorheological finishing, and ion beam figuring are highly accurate processes but typically exhibit low material removal rate (MRR) and must be applied prior to coatings whose stress can significantly deform thin substrates. Stress figuring processes are an alternative class of processes where stress is applied to a substrate to controllably bend it to correct figure errors. Many stress figuring processes often leave the optical surface unaffected, potentially enabling correction after reflective coatings are deposited. Furthermore, with stress figuring the substrate tends to filter spatial stress variations, reducing the risk of introducing mid-spatial-frequency height errors.

Focused ultrafast laser pulses (with pulse durations of femtosecond to picosecond) can generate strain and stress in glass which has been used commercially to correct absorber positions in lithographic masks. The present disclosure demonstrates the use of ultrafast lasers to correct figure errors in glass mirror substrates by generating controllable stress within the substrates to cause bending. Accurate full-aperture figure correction requires independent magnitude control of all plane stress components: two principal stresses $N_1$ and $N_2$, and their orientation $\phi$ (or equivalently, both normal stresses and the shear stress). Integrated stress (akin to a thin film stress on the surface multiplied by the film thickness) generates changes in the principal curvatures $\kappa_1$ and $\kappa_2$ by a modified Stoney's equation, $$N_1 = Eh_s^2(\kappa_1 + \nu\kappa_2)/[6(1-\nu^2)],\ N_2 = Eh_s^2(\kappa_2 + \nu\kappa_1)/[6(1-\nu^2)], \quad (1)$$

where E and v are the elastic modulus and Poisson's ratio of the substrate, and $h_s$ is the substrate thickness.

Experimental results show ultrafast lasers can be used to generate the needed stress control in adequate magnitudes for figure correction. The present disclosure demonstrates this figuring process by correcting power and astigmatism for flat float glass mirrors. The present disclosure demonstrates shows 5-15×RMS height reduction with a high equivalent material removal rate.

Experimental Methods, Results, and Discussion

Figure 11:
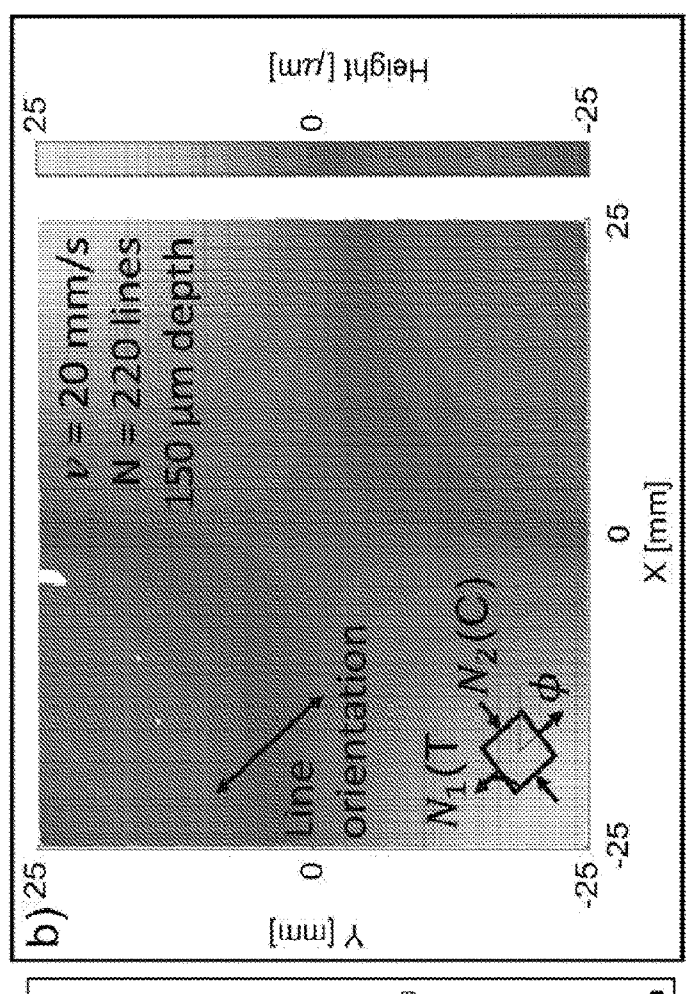
FIG. 11*a* shows a photograph of a mirror after processing.
FIG. 11*b* shows a typical deformation map due to laser processing, and integrated stress components $N_1$ (tensile) and $N_2$ (compressive) oriented at angle $\phi$.
FIG. 11*c* shows a variation of integrated stress with write speed and depth.
Figure 11:
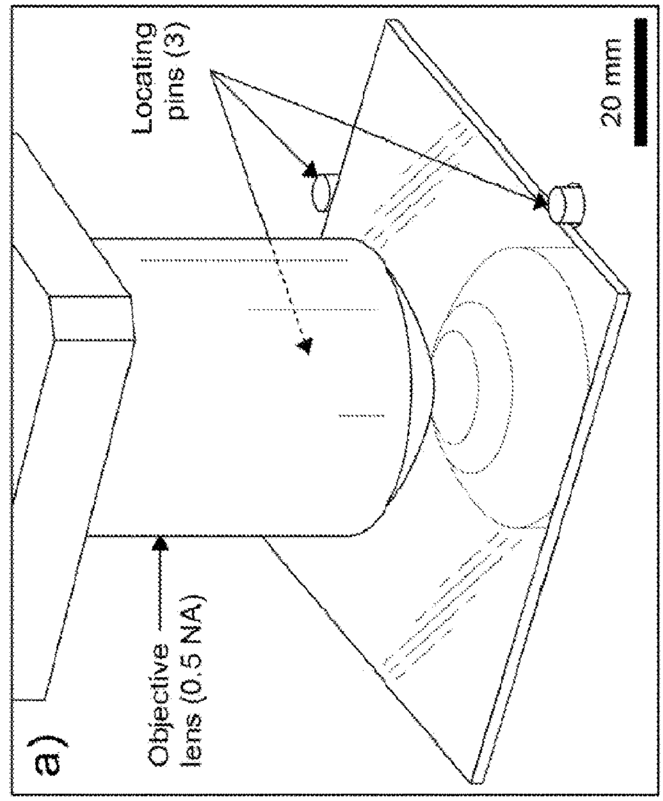
Figure 11:
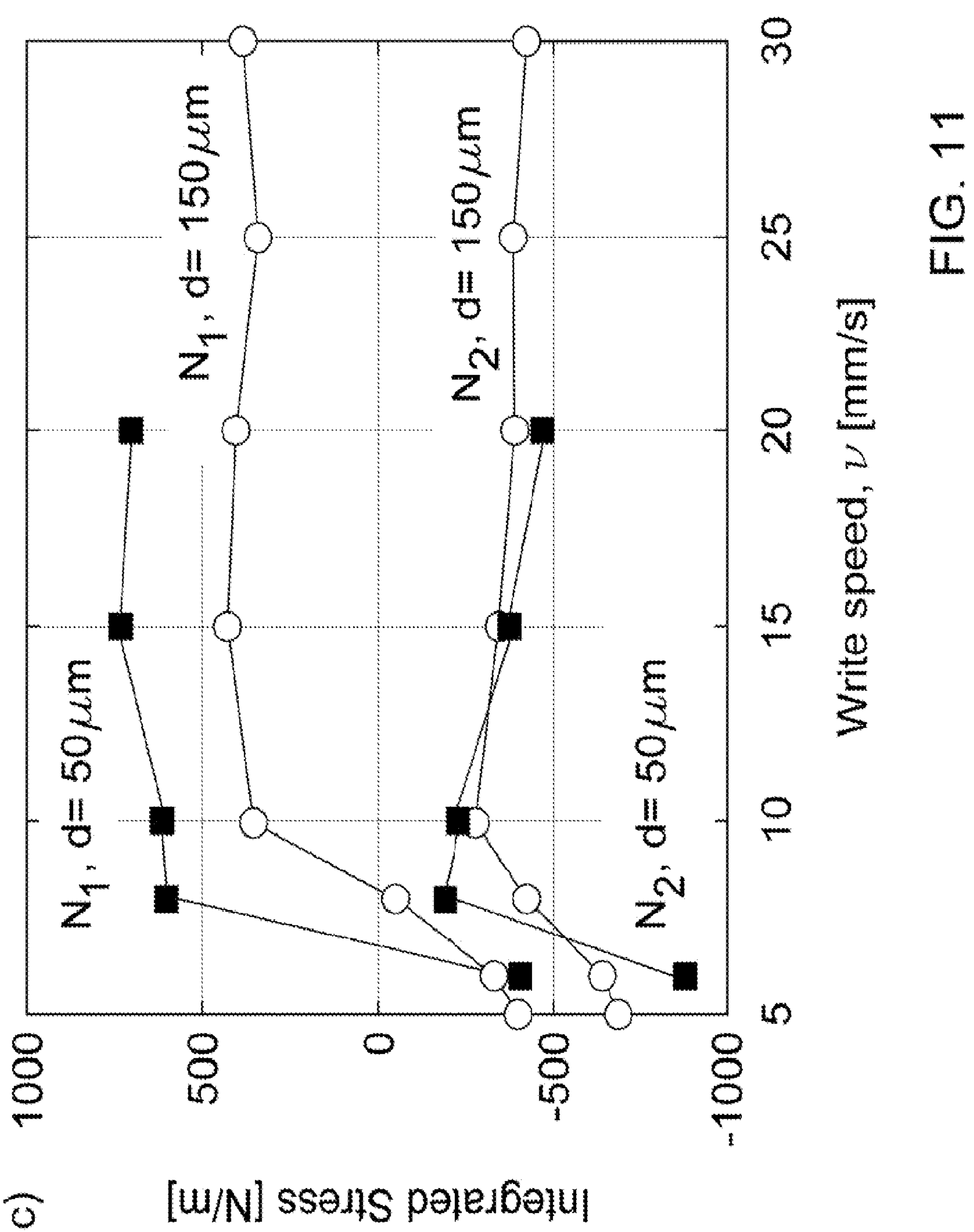

Modifications in float glass mirror substrates (Rolyn Optics, 50 mm square, 1.1 mm thick, Aflex B coated) were generated using an ultrafast laser (Ti:Sapphire λ=810 nm, 100 fs pulse duration, 33 nJ pulse energy, 80 MHz pulse repetition rate) focused with a microscope objective (0.5 NA). The mirrors were mounted coated-side-down on a 3-axis motorized stage (Aerotech PlanarDL/AVSI100), as shown in FIG. 11A. The mirrors were translated to write lines below the uncoated back surface at various speeds, locations, depths, and orientations. Mirror figure (on the coated side) was measured before and after line-writing using a Zygo Verifire Fizeau interferometer, with the mirrors held vertically (gravity vector perpendicular to surface-normal) and resting on 2 PTFE-coated pins. The average principal curvature changes were calculated from the difference of the measured height maps before and after processing (e.g., FIG. 11B), and Eq. (1) was used to calculate the generated integrated stress.

Lines in six mirrors were written, with lines spaced 0.1 mm apart, to establish the relationship between write speed and the generated integrated stress components, with lines written at two different depths (FIG. 11C). These data are combined from all six mirrors. The first principal stress component $N_1$ is in all cases more tensile than $N_2$, and both vary with speed. This is similar to the stresses observed from other high-energy-density processes like ion implantation, which is driven by a heating-and-quenching effect. As the write speed decreases, the shape of the laser-heated region becomes more symmetric and the difference between the two principal stress components becomes smaller. The stress orientation $\phi$ is not plotted in FIG. 11C, but was always found to be within 0.5° of the line orientation.

The data in FIG. 11C was used to determine the number of lines, their orientations, and write-speeds required to flatten three of these mirrors (mirrors were re-used due to supply limitations). The lines were spaced out to avoid print-through. In all cases, the initial mirror figure was dominated by power and astigmatism terms (Zernike terms $$Z_2^0 \text{ and } Z_2^{\pm 2}$$

Figure 12:
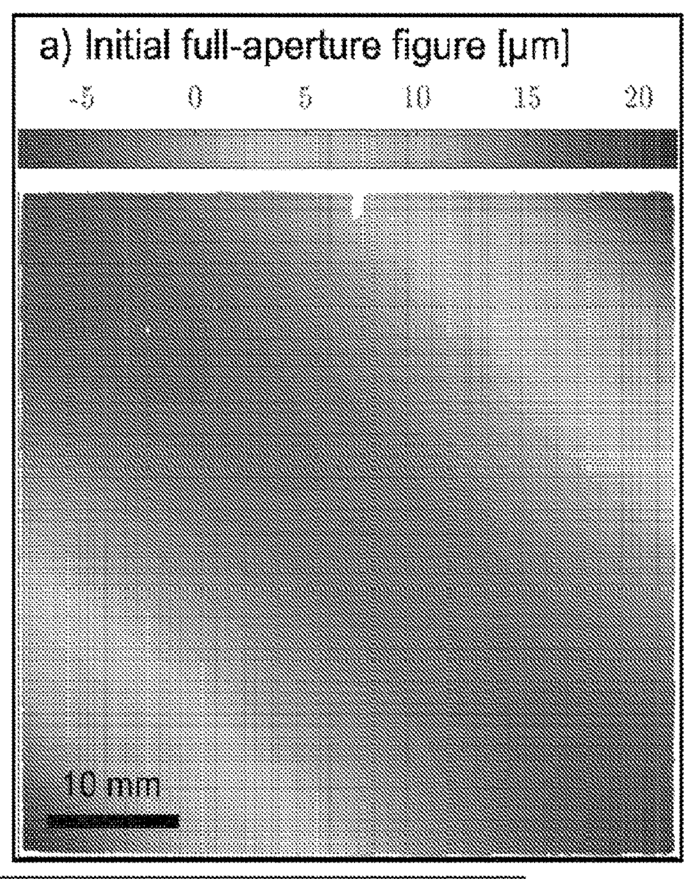
FIG. 12*a* shows a mirror figure before ultrafast laser figure correction.
FIG. 12*b* shows a mirror figure after ultrafast laser figure correction.
FIG. 12*c* shows interferometric microscope maps of coated surface.
Figure 12:
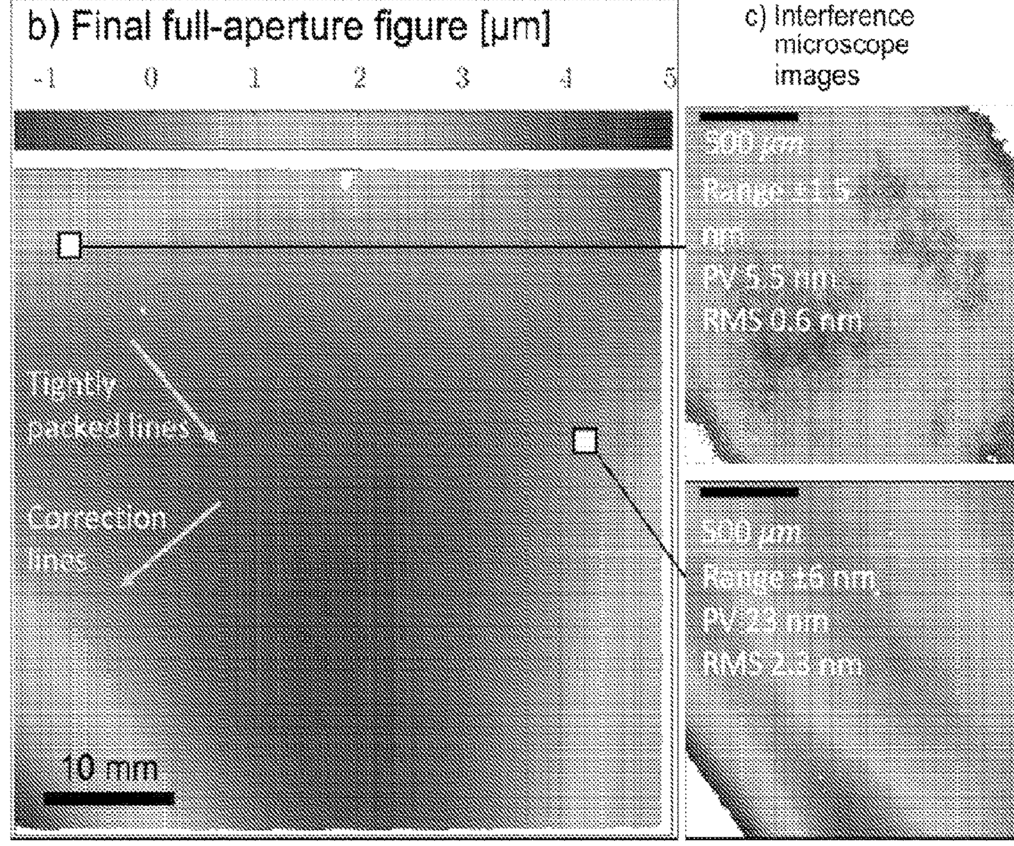

Correcting power and astigmatism requires applying uniform $N_1$, $N_2$ and $\phi$, and, due to a lack of electronic control over laser power, those terms were only attempted to be removed. FIGS. 12A and 12B show the measured figure of one mirror before and after processing. Initial heights were measured as 5 to 12 μm RMS and final heights as 0.9 to 1.7 μm RMS, with 5 to 15× improvement in 13 to 28 minutes of writing time (MRR 55 to 450 $mm^3$/hr). The diagonal lines in FIG. 12B are from initial testing with densely spaced lines, and no such lines are evident due to the processing for figure correction. The coated surface was inspected using a Zygo NewView 8000 with a 10× Mirau objective and no effects on the aluminum mirror coating (FIG. 12C) were observed. A 0.3 μm RMS change in $$Z_2^0$$

and <0.05 μm RMS change in $$Z_2^{\pm 2}$$

over 4 days was observed, indicating float glass is not perfectly stable with these processing parameters.

The present disclosure relates to stress generation and control using focused ultrafast laser pulses. Favorable results have been achieved, by example, using stress to flatten float glass mirrors, enabling estimates of the accuracy of the technique as well as the process speed.

The present disclosure comprises at least the following aspects:

Aspect 1: A method for determining laser pulse positions for shaping an optical element, the method comprising: determining, based at least on a computational model and a target substrate deformation, a stress field for at least a portion of a substrate, wherein the stress field comprises at least three components of stress, wherein the stress field comprises a plurality of stress states for the at least a portion of the substrate; determining, based at least on the stress field and a calibration model, a spot density over the at least a portion of the substrate; determining, based on the spot density, a laser spot position allocation that arranges a number of laser pulses into a minimum number of lines that achieves the spot density; and causing, based on the laser spot position allocation, output of a machine program that coordinates a rotation stage, beam shaping, a translation stage, and a laser firing parameter for surface shaping of the at least a portion of the substrate.

Aspect 2: The method of aspect 1, wherein the determining a stress field is based on one or more of surface measurement or substrate geometry.

Aspect 3: The method of any one of aspects 1-2, wherein the calibration model comprises a plurality of calibration constants derived from the stress field.

Aspect 4: The method of any one of aspects 1-3, determining, based at least on the stress field and a calibration model, a spot density over the at least a portion of the substrate comprises writing laser pulses in a plurality of patterns over a comparative sample made of the same material as the at least a portion of the substrate.

Aspect 5: The method of any one of aspects 1-4, wherein the plurality of stress states comprises six stress states.

Aspect 6: The method of any one of aspects 1-5, wherein the plurality of stress states comprises six integrated stress states generated per unit of areal pulse density.

Aspect 7: The method of any one of aspects 1-6, wherein the laser firing parameter comprises one or more of energy, duration, spatial shape, or polarization.

Aspect 8: A system for implementing any one of the methods of aspects 1-7.

Aspect 9: The system of aspect 8, wherein the system comprises one or more of a laser source, polarization stage, a beam orientation stage, an optical relay system, an objective lens, or an XYZ stage.

Aspect 10: A method for determining laser pulse positions for shaping an optical element, the method comprising: determining, based at least on a computational model and a target substrate deformation, a stress field for at least a portion of a substrate, wherein the stress field comprises at least three components of stress, wherein the stress field comprises a plurality of stress states for the at least a portion of the substrate; determining, based on the stress field, one or more calibration constants; determining, based on at least on the one or more calibration constants, a spot density over the at least a portion of the substrate; determining, based on the spot density, a laser spot position allocation that arranges a number of laser pulses into a minimum number of lines that achieves the spot density; and causing, based on the laser spot position allocation, output of a machine program that coordinates a rotation stage, a translation stage, and a laser firing for surface shaping of the at least a portion of the substrate.

Aspect 11: The method of aspect 10, wherein the determining a stress field is based on one or more of surface measurement or substrate geometry.

Aspect 12: The method of any one of aspects 10-11, determining, based on at least on the one or more calibration constants, a spot density over the at least a portion of the substrate comprises writing laser pulses in a plurality of patterns over a comparative sample made of the same material as the at least a portion of the substrate.

Aspect 13: A system for implementing any one of the methods of aspects 10-12.

Aspect 14: The system of aspect 13, wherein the system comprises one or more of a laser source, polarization stage, a beam orientation stage, an optical relay system, an objective lens, or an XYZ stage.

Aspect 15: A method for iterative correction of a shaped substrate, the method comprising: determining, by measuring a substrate surface, that the substrate is outside a target specification; determining, using a location of prior write pulses applied to the substrate, an unmodified region of the substrate; causing, using one or more corrective write pulses, corrective surface shaping of at least a portion of the unmodified region of the substrate; and determining, by measuring the substrate surface, whether the corrected substrate is outside the target specification.

Aspect 16: The method of aspect 15, wherein the method is repeated until the corrected substrate is within the target specification.

Aspect 17: The method of any one of aspects 15-16, wherein the causing, using one or more corrective write pulses, corrective surface shaping comprises: determining, based at least on a computational model and a target substrate deformation, a stress field for at least a portion of a substrate, wherein the stress field comprises at least three components of stress, wherein the stress field comprises a plurality of stress states for the at least a portion of the substrate; determining, based at least on the stress field and a calibration model, a spot density over the at least a portion of the substrate; determining, based on the spot density, a laser spot position allocation that arranges a number of laser pulses into a minimum number of lines that achieves the spot density; and causing, based on the laser spot position allocation, output of a machine program that coordinates a rotation stage, beam shaping, a translation stage, and a laser firing parameter for surface shaping of the at least a portion of the substrate.

Aspect 18: The method of any one of aspects 15-17, wherein the causing, using one or more corrective write pulses, corrective surface shaping comprises: determining, based at least on a computational model and a target substrate deformation, a stress field for at least a portion of a substrate, wherein the stress field comprises at least three components of stress, wherein the stress field comprises a plurality of stress states for the at least a portion of the substrate; determining, based on the stress field, one or more calibration constants; determining, based on at least on the one or more calibration constants, a spot density over the at least a portion of the substrate; determining, based on the spot density, a laser spot position allocation that arranges a number of laser pulses into a minimum number of lines that achieves the spot density; and causing, based on the laser spot position allocation, output of a machine program that coordinates a rotation stage, a translation stage, and a laser firing for surface shaping of the at least a portion of the substrate.

Aspect 19: A system for implementing any one of the methods of aspects 15-18.

Aspect 20: The system of aspect 19, wherein the system comprises one or more of a laser source, polarization stage, a beam orientation stage, an optical relay system, an objective lens, or an XYZ stage.

Aspect 21: A shaped optical substrate comprising: a main body; a plurality of laser-generated modifications formed in the main body, wherein the laser-generated modifications have a polarization that correlates with a stress state orientation of the a portion of the main body adjacent the respective modification, and wherein the laser-generated modifications are grouped by polarization; a plurality of unmodified regions defined in the main body by the absence of the laser generated modifications.

Aspect 22: The shaped optical substrate of aspect 21, wherein the main comprises silica.

Aspect 23: The shaped optical substrate of any one of aspects 21-22, wherein the plurality of laser-generated modifications comprises lines.

Aspect 24: The shaped optical substrate of any one of aspects 21-23, wherein the laser-generated modifications are grouped along a plurality of polarization axes.

Aspect 25: The shaped optical substrate of any one of aspects 21-24, wherein one of the plurality of polarization axes is brighter than the others when viewed through crossed polarizers at ±450 orientations.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated but should be constructed to cohere with all modifications that may fall within the scope of the appended claims.

What is claimed is:

1. A method for determining laser pulse positions for shaping an optical element, the method comprising:

determining, based at least on a computational model and a target substrate deformation, a stress field for at least a portion of a substrate, wherein the stress field comprises at least three components of stress, wherein the stress field comprises a plurality of stress states for the at least a portion of the substrate;

determining, based at least on the stress field and a calibration model, a spot density over the at least a portion of the substrate;

determining, based on the spot density, a laser spot position allocation that arranges a number of laser pulses into a minimum number of lines that achieves the spot density; and causing, based on the laser spot position allocation, output of a machine program that coordinates a rotation stage, beam shaping, a translation stage, and a laser firing parameter for surface shaping of the at least a portion of the substrate.

2. The method of claim 1, wherein the determining a stress field is based on one or more of surface measurement or substrate geometry.

3. The method of claim 1, wherein the calibration model comprises a plurality of calibration constants derived from the stress field.

4. The method of claim 1, determining, based at least on the stress field and a calibration model, a spot density over the at least a portion of the substrate comprises writing laser pulses in a plurality of patterns over a comparative sample made of the same material as the at least a portion of the substrate.

5. The method of claim 1, wherein the plurality of stress states comprises six stress states.

6. The method of claim 1, wherein the plurality of stress states comprises six integrated stress states generated per unit of areal pulse density.

7. The method of claim 1, wherein the laser firing parameter comprises one or more of energy, duration, spatial shape, or polarization.

8. A system for implementing the method of claim 1.

9. The system of claim 8, wherein the system comprises one or more of a laser source, a polarization stage, a beam orientation stage, an optical relay system, an objective lens, or an XYZ stage.

10. A method for determining laser pulse positions for shaping an optical element, the method comprising:

determining, based at least on a computational model and a target substrate deformation, a stress field for at least a portion of a substrate, wherein the stress field comprises at least three components of stress, wherein the stress field comprises a plurality of stress states for the at least a portion of the substrate;

determining, based on the stress field, one or more calibration constants;

determining, based on at least on the one or more calibration constants, a spot density over the at least a portion of the substrate;

determining, based on the spot density, a laser spot position allocation that arranges a number of laser pulses into a minimum number of lines that achieves the spot density; and causing, based on the laser spot position allocation, output of a machine program that coordinates a rotation stage, a translation stage, and a laser firing for surface shaping of the at least a portion of the substrate.

11. The method of claim 10, wherein the determining a stress field is based on one or more of surface measurement or substrate geometry.

12. The method of claim 10, determining, based on at least on the one or more calibration constants, a spot density over the at least a portion of the substrate comprises writing laser pulses in a plurality of patterns over a comparative sample made of the same material as the at least a portion of the substrate.

13. A system for implementing the method of claim 10.

14. The system of claim 13, wherein the system comprises one or more of a laser source, a polarization stage, a beam orientation stage, an optical relay system, an objective lens, or an XYZ stage.

* * * * *